(12) United States Patent
Tsai et al.

(10) Patent No.: US 6,522,526 B2
(45) Date of Patent: Feb. 18, 2003

(54) TCNQ COMPLEX AND ITS APPLICATION IN SOLID ELECTROLYTIC CAPACITORS

(75) Inventors: Li-Duan Tsai, Hsinchu (TW); Chang-Lin Chyung, Tainan (TW); Wen-Nan Tseng, Nantown (TW); Yu-Tim Tseng, Miaoli Hsien (TW); Yu-Min Peng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/002,197

(22) Filed: Dec. 5, 2001

(65) Prior Publication Data

US 2002/0163774 A1 Nov. 7, 2002

(30) Foreign Application Priority Data

Dec. 5, 2000 (TW) .......................... 89125857 A

(51) Int. Cl.$^7$ ................................. H01G 9/00
(52) U.S. Cl. ................. 361/523; 361/528; 361/525; 361/518; 29/25.03
(58) Field of Search ............... 361/433, 523, 361/524, 527, 528, 529, 510, 518, 271, 525; 29/25.03

(56) References Cited

U.S. PATENT DOCUMENTS

| | | | | |
|---|---|---|---|---|
| 3,955,126 A | * | 5/1976 | Murakami et al. | 317/230 |
| 4,590,541 A | * | 5/1986 | Takahashi et al. | 361/433 |
| 4,679,124 A | * | 7/1987 | Yoshimura et al. | 361/433 |
| 4,688,153 A | * | 8/1987 | Ebisawa et al. | 361/433 |
| 4,828,738 A | * | 5/1989 | Tsuchiya et al. | 252/62.2 |
| 4,982,312 A | | 1/1991 | Shindo et al. | |
| 5,031,077 A | | 7/1991 | Niwa et al. | |
| 5,579,150 A | * | 11/1996 | Cho et al. | 359/241 |
| 5,766,271 A | | 6/1998 | Suenaga et al. | |
| 6,351,370 B1 | * | 2/2002 | Konuma et al. | 361/523 |

* cited by examiner

*Primary Examiner*—Dean A. Reichard
*Assistant Examiner*—Nguyen Ha
(74) *Attorney, Agent, or Firm*—Birch, Stewart, Kolasch & Birch, LLP

(57) ABSTRACT

The present invention discloses TCNQ complex, shown as the following formula:

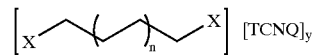

wherein X represents identical or different double electron donors, TCNQ represents tetracyanoquinodimethane. The TCNQ complex is prepared by synthesizing TCNQ with double electron donors as the major composition. Different ratios between compositions can be adjusted based on the distinct properties of various electron donors to conform to different needs of manufacturing process. The TCNQ complex of the present invention is resistant to high voltage and high temperature. Its melting point is higher than the soldering temperature. In addition, the TCNQ complex has better conductivity that remains even after the heating/cooling cycle.

12 Claims, No Drawings

TCNQ COMPLEX AND ITS APPLICATION IN SOLID ELECTROLYTIC CAPACITORS

BACKGROUND OF THE INVENTION

1. Field of the Invention

The present invention relates to electrolytes in solid capacitors, and more particularly to an electrolyte comprised of TCNQ complex having electron donors with double charges as the major component.

2. Description of the Prior Art

Conventional electrolytic capacitors mostly use electrolytes, however, the need for solid electrolytic capacitors has increased in recent years.

Various compositions of TCNQ complex as the electrolyte of organic semiconductor electrolytic capacitors have been disclosed in U.S. Pat. Nos. 4,982,312, 5,031,077, and 5,766,271. Generally speaking, the TCNQ complex disclosed so far has low melting point, and cannot withstand thermal stress caused in soldering (about 230° C.). Consequently, it tends to degrade, creating a noticeable leakage of current. Although a TCNQ complex with high melting point has been disclosed to increase the resistance to heat, after thermal melting and cooling to solidify, the conductivity of TCNQ complex decreases considerably. As a result, excellent high frequency characteristics of TCNQ complex are deducted.

Most conventional research on TCNQ complex is confined to electron donors with a single electric charge. Those TCNQ complex, such as alkyl-iso-quinolinium(TCNQ)$_2$ though widely used, still cannot be used with higher voltages (~25V). Though there is some discussion of TCNQ complex formed by alkylene-di-lutidinium(TCNQ)$_4$, focus is on its application without sufficient disclosure of TCNQ complex itself. Moreover, the complex disclosed, largely used with high voltages (~25V) still does not meet requirements.

SUMMARY OF THE INVENTION

The object of the present invention is to provide a TCNQ complex formed by salts with double positive charges and TCNQ. The structure of the salt contains functional groups having two electric charge separated by carbon chains of different carbon numbers (normally 21~16 carbon straight chain, and saturated alkyl or unsaturated ones that is π resonance). The functional group having two electric charges can be the same (symmetrical) or different (asymmetrical). The TCNQ complex formed by combining the salts and 2~4 TCNQ has the following advantages:

1. Excellent conductivity: higher melting point than existing TCNQ complex, and good conductivity maintained even after thermal melting process.
2. Good thermal stability: allows effective control and adjustment to meet specific process requirements. The solid electrolyte created will not degrade in physical properties caused by thermal melting.
3. After thermal/cooling, the melting point increases and the decomposing point remains constant at the second thermal melting.

The synthetic process to prepare the TCNQ complex, shown in the following formula:

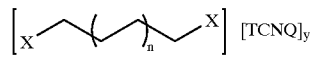

is as follows:

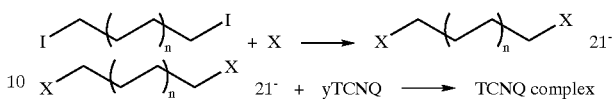

wherein the electron donors X are quinoline, isoquinoline, lutidine, picoline, pyridine, imidazole, benzoimidazole or their derivatives and combination thereof; l represents leaving group, such as iodine ion, bromine ion, chlorine ion and p-toluenesulfonate etc, and n is a positive integer between 0 and 14; the ratio of TCNQ/electron donor (y) is between 2.5 and 4.0. Optionally, the complex is further comprised of a benzene ring in the carbon chain.

In addition, when used as the electrolyte of a solid capacitor, the double-charge TCNQ complex of the present invention can be mixed with single-charge TCNQ complex.

The present invention will become more fully understood from the preferred embodiments given hereinbelow, given by way of illustration only and thus not intended to be limitative of the present invention.

DESCRIPTION OF THE PREFERRED EMBODIMENTS

1$^{st}$ Embodiment 1.26 g of 3,5-lutidine was dissolved in acetonitrile, followed by the addition of 2.15 g of a mixed solution of 1,8-diiodooctane and acetonitrile. The solution was then subjected to reflux heating, cooling and filtration. The donor salt was washed in a solvent and dried.

TCNQ was dissolved in acetonitrile; it is then heated to dissolve TCNQ. Next, donor salt was added in 1/0.5 to 1/4 equivalent. The salt can also be added in batches. The solution was then continuously reflux-heated, followed by cooling and filtration. The final product was washed in solvent and dried.

The TCNQ complex obtained was subjected to tests on $T_m$, $T_d$, $\Delta T$ and conductivity. The results are shown in Table 1.

TABLE 1

| C$_8$Lu$_2$/TCNQ | $T_m$ | $T_d$ | $\Delta T$ | S/cm |
|---|---|---|---|---|
| 1/0.5 | 232 | 250 | 18 | 5.0 × 10$^{-8}$ |
| 1/1 | 232 | 248 | 16 | 4.9 × 10$^{-8}$ |
| 1/1.5 | 232 | 251 | 19 | 4.9 × 10$^{-8}$ |
| 1/2 | 219/225 | 260 | 41/35 | 4.9 × 10$^{-8}$ |
| 1/2.5 | 215/223 | 261 | 36/38 | 6.8 × 10$^{-2}$ |
| 1/2.75 | 231 | 270 | 39 | 1.5 × 10$^{-1}$ |
| 1/3 | 227 | 259 | 32 | 7.2 × 10$^{-2}$ |
| 1/3.5 | 227 | 258 | 31 | 2.5 × 10$^{-2}$ |
| 1/4 | 228 | 255 | 27 | 2.0 × 10$^{-2}$ |

(Lu stands for lutidine)

2$^{nd}$ Embodiment

Repeat the steps in the 1$^{st}$ Embodiment, except that the formula for TCNQ complex was 1.29 g of isoquinoline, 1.83 g of 1,8-diiodooctane and 2.8 g of TCNQ. The properties of the complex are listed in Table 2.

3$^{rd}$ Embodiment

Repeat the steps in the 1$^{st}$ Embodiment, except that the formula for TCNQ complex was 1.29 g of quinoline, 1.83 g of 1,8-diiodooctane and 2.8 g of TCNQ. The properties of the complex are listed in Table 2.

4th Embodiment

Repeat the steps in the 1st Embodiment, except that the formula for TCNQ complex was 1.07 g of lutidine, 1.83 g of 1,8-diiodooctane and 2.8 g of TCNQ. The properties of the complex are listed in Table 2.

5th Embodiment

Repeat the steps in the 1st Embodiment, except that the formula for TCNQ complex was 0.65 g of isoquinoline, 0.65 g of quinoline, 1.83 g of 1,8-diiodooctane and 2.8 g of TCNQ. The properties of the complex are listed in Table 2.

6th Embodiment

Repeat the steps in the 1st Embodiment, except that the formula for TCNQ complex was 0.65 g of isoquinoline, 0.54 g of lutidine, 1.83 g of 1,8-diiodooctane and 2.8 g of TCNQ. The properties of the complex are listed in Table 2.

7th Embodiment

Repeat the steps in the 1st Embodiment, except that the formula for TCNQ complex was 0.65 g of quinoline, 0.54 g of lutidine, 1.83 g of 1,8-diiodooctane and 2.8 g of TCNQ. The properties of the complex are listed in Table 2.

8th Embodiment

Repeat the steps in the 1st Embodiment, except that the formula for TCNQ complex was 0.33 g of isoquinoline, 0.33 g of quinoline, 0.54 g of lutidine, 1.83 g of 1,8-diiodooctane and 2.8 g of TCNQ. The properties of the complex are listed in Table 2.

9th Embodiment

Repeat the steps in the 1st Embodiment, except that the formula for TCNQ complex was 1.29 g of isoquinoline, 1.97 g of 1,10-diiododecane and 2.8 g of TCNQ. The properties of the complex are listed in Table 2.

Comparative Embodiment 1.29 g of isoquinoline was dissolved in acetonitrile, followed by the addition of a mixed solution of acetonitrile and 1.84 g of n-butyliodode. The solution was then subjected to reflux heating for 1 hour, and then cooled and filtered. The donor salt was washed in a solvent and dried.

2 g of TCNQ was dissolved in acetonitrile; it is then heated to dissolve TCNQ. Next, a solution of 1.4 g donor salt in acetonitrile was added to the TCNQ solution. The solution was then continuously reflux-heated, followed by cooling and filtration. The final product was washed in solvent and dried.

$T_m$, $T_d$ and conductivity of the TCNQ complex prepared are tested and listed in Table 2.

TABLE 2

|  | Tm (° C.) | Td (° C.) | Conductivity (S/cm) |
|---|---|---|---|
| 2nd Embodiment | 260 | 277 | $<10^{-6}$ |
| 3rd Embodiment | 256 | 268 | $\sim 10^{-6}$ |
| 4th Embodiment | 231 | 270 | 0.15 |
| 5th Embodiment | 255 | 269 | $\sim 10^{-6}$ |
| 6th Embodiment | 224/239 | 270 | 0.27 |
| 7th Embodiment | 230 | 260 | 0.28 |

TABLE 2-continued

|  | Tm (° C.) | Td (° C.) | Conductivity (S/cm) |
|---|---|---|---|
| 8th Embodiment | 222 | 270 | 0.08 |
| 9th Embodiment | 253 | 275 | 0.8 |
| Comparative Embodiment | 224 | 275 | 0.01 |

10th Embodiment 200 mg of various TCNQ complex prepared in the above embodiments (as listed in Table 3) were heated in Al containers to completely molten. The molten TCNQ complexes were then cooled and tested for $T_m$, $T_d$ and conductivity before and after thermal melting.

TABLE 3

|  | Before thermal melt | | After thermal melt | |
|---|---|---|---|---|
|  | S/cm | Temp ($T_m/T_d$) | S/cm | Temp ($T_m/T_d$) |
| 4th Embodiment | 0.15 | 231/270 | 4.1 | 229/267 |
| 7th Embodiment | 0.28 | 230/260 | 2.4 | 235/260 |
| 9th Embodiment | 0.8 | 253/275 | 1.1 | 243/262 |
| Comparative Embodiment | 0.01 | 224/275 | 0.564 | 216/263 |

The molten TCNQ complexes as described above were then tested for conductivity and other thermal properties after thermal process at 85° C. or 105° C. for 100 hours. The results are shown in Table 4.

TABLE 4

|  | After thermal melting/85° C., 100 h | | After thermal melting/105° C., 100 h | |
|---|---|---|---|---|
|  | S/cm | Temp ($T_m/T_d$) | S/cm | Temp ($T_m/T_d$) |
| 4th Embodiment | 4.44 | 229/270 | 1.44 | 229/269 |
| 7th Embodiment | 2.57 | 235/261 | 1.68 | 240/262 |
| 9th Embodiment | 1.32 | 243/260 | 1.2 | 242/259 |
| Comparative Embodiment | 0.514 | 216/260 | 1.04 | 217/259 |

11th Embodiment

TCNQ complex prepared in the 9th Embodiment and comparative embodiment were pressed to form tablets, followed by placing them in an Al case. The tablets were heated to melt and then combined with capacitor element. The results are listed in Table 5.

TABLE 5

| TCNQ Complex Salt | CAP (μF) | Z (Ω) | ESR (Ω) | DF (%) | Max Resistance to Voltage (V) |
|---|---|---|---|---|---|
| 9th Embodiment | 155.1 | 8.56 | 0.28 | 2.78 | 31 |
| Comparative Embodiment | 155.2 | 8.55 | 0.24 | 2.78 | 25 |

Capacitor specifications: 150 μF/16V, φ10 mm × 10.5 mm

As shown in Table 1, the preferred ratio of TCNQ/electron donors is from 2.5 to 4.0, wherein the obtained conductivity is higher.

It is observed from Table 2 that when the carbon chain is the same length, asymmetrical TCNQ complex has better conductivity and has higher melting point then the one in Comparative Embodiment, i.e. higher than the soldering temperature. Hence, by having various types and ratios of electron donors, different standards of TCNQ complex can be prepared.

Table 3 shows that the conductivity of various TCNQ complex increase after thermal melting. However, $T_m$ and $T_d$ decrease noticeably in the Comparative Embodiment. For the embodiments of this invention, $T_m$ does not change noticeably after thermal melting, and remain higher than the soldering temperature. For example, in $7^{th}$ Embodiment, $T_m$ increases after thermal melting, and $T_d$ remains constant. Therefore, capacitors/battery made from the TCNQ complex of this invention are able to avoid second thermal melting when soldered. In addition, in Table 4, it is illustrated that after thermal melting and 100 hours of thermal treatment at 85 or 105° C., conductivity of the TCNQ complex of this invention all have stable and better conductivity than the one in the Comparative Embodiment. Thus, the object of this invention is accomplished.

Moreover, in Table 5, the resistance to voltage of the capacitor made from the TCNQ complex of $9^{th}$ Embodiment is higher than 30V, better than the products in the current market.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A TCNQ complex, shown in the following formula:

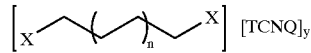

wherein X represents double electron donors; TCNQ represents tetracyanoquinodimethane; n is positive integers between 0 and 14; and the ratio of TCNQ/electron donors (y) is between 2.5 and 4.0.

2. The complex as claimed in claim 1, wherein the electron donors X are quinoline, isoquinoline, lutidine, picoline, pyridine, imidazole, benzoimidazole or combinations thereof.

3. The complex as claimed in claim 1, wherein the melting point of the complex is higher than 230° C.

4. The complex as claimed in claim 1, wherein the complex is synthesized by the reaction of mixed different electron donors.

5. The complex as claimed in claim 1, wherein the complex is synthesized by the reaction of adding different electron donors one by one.

6. The complex as claimed in claim 1, wherein the complex further comprises a benzene ring in the carbon chain.

7. A solid electrolytic capacitor manufactured by using the TCNQ complex as claimed in claim 1.

8. A solid electrolytic capacitor manufactured by using the TCNQ complex as claimed in claim 2.

9. The electrolyte of a solid electrolytic capacitor as claimed in claim 7, further comprising a single electron type TCNQ complex.

10. The electrolyte of a solid electrolytic capacitor as claimed in claim 8, further comprising a single electron type TCNQ complex.

11. The electrolyte of a solid electrolytic capacitor as claimed in claim 7 further comprising additive.

12. The electrolyte of a solid electrolytic capacitor as claimed in claim 8 further comprising additive.

* * * * *